Nov. 17, 1959  F. W. GEBHARD  2,913,587
DUAL BATTERY SWITCH SYSTEM
Filed June 10, 1955  3 Sheets-Sheet 1

Frederick W. Gebhard
INVENTOR.

Nov. 17, 1959  F. W. GEBHARD  2,913,587
DUAL BATTERY SWITCH SYSTEM
Filed June 10, 1955  3 Sheets-Sheet 2
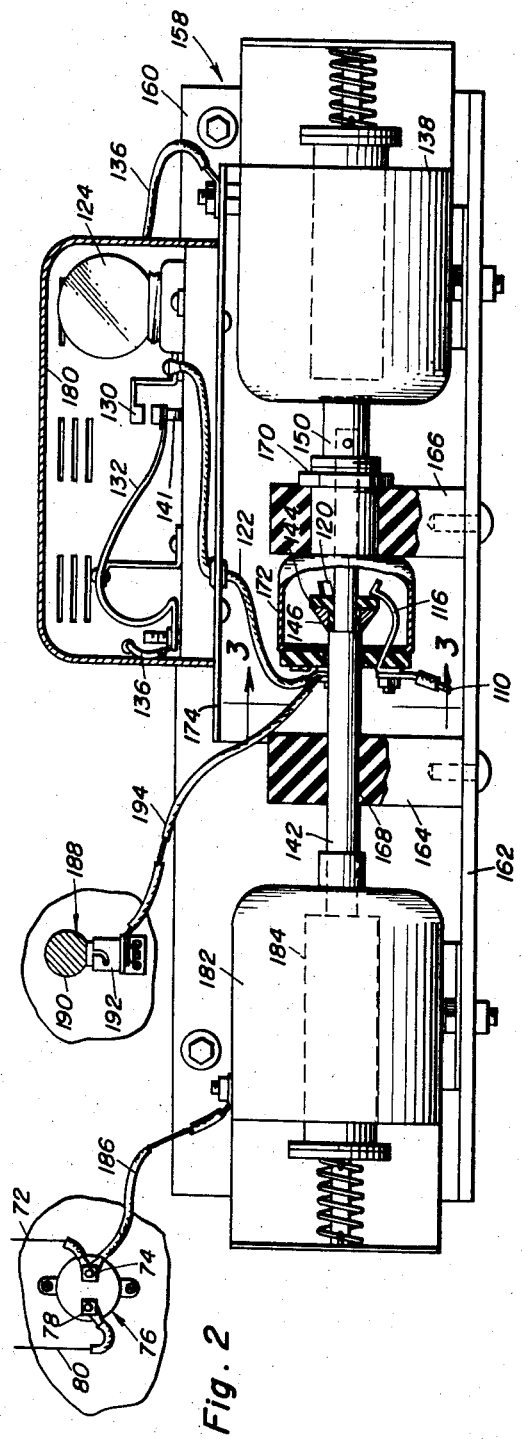
Fig. 2
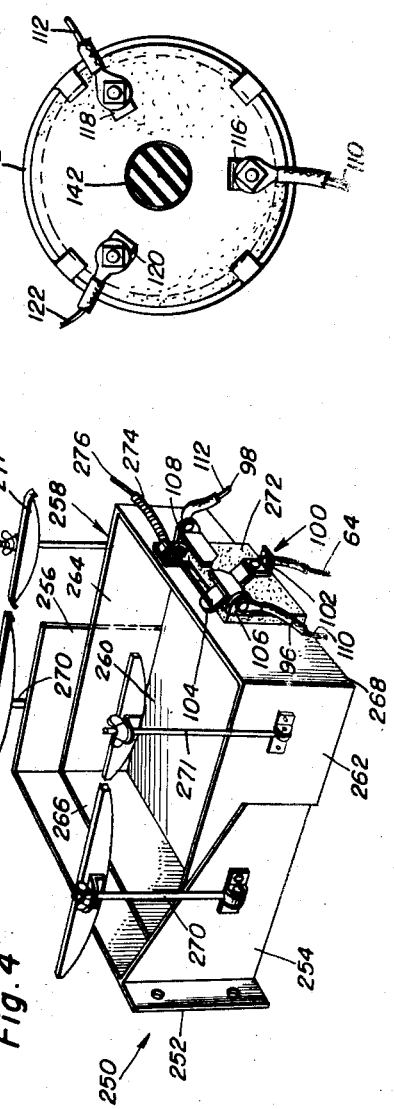
Fig. 3
Fig. 4
Frederick W. Gebhard
INVENTOR.
BY *Clarence A. O'Brien*
*and Harvey B. Jacobson*
Attorneys Nov. 17, 1959　　　F. W. GEBHARD　　　2,913,587
DUAL BATTERY SWITCH SYSTEM
Filed June 10, 1955
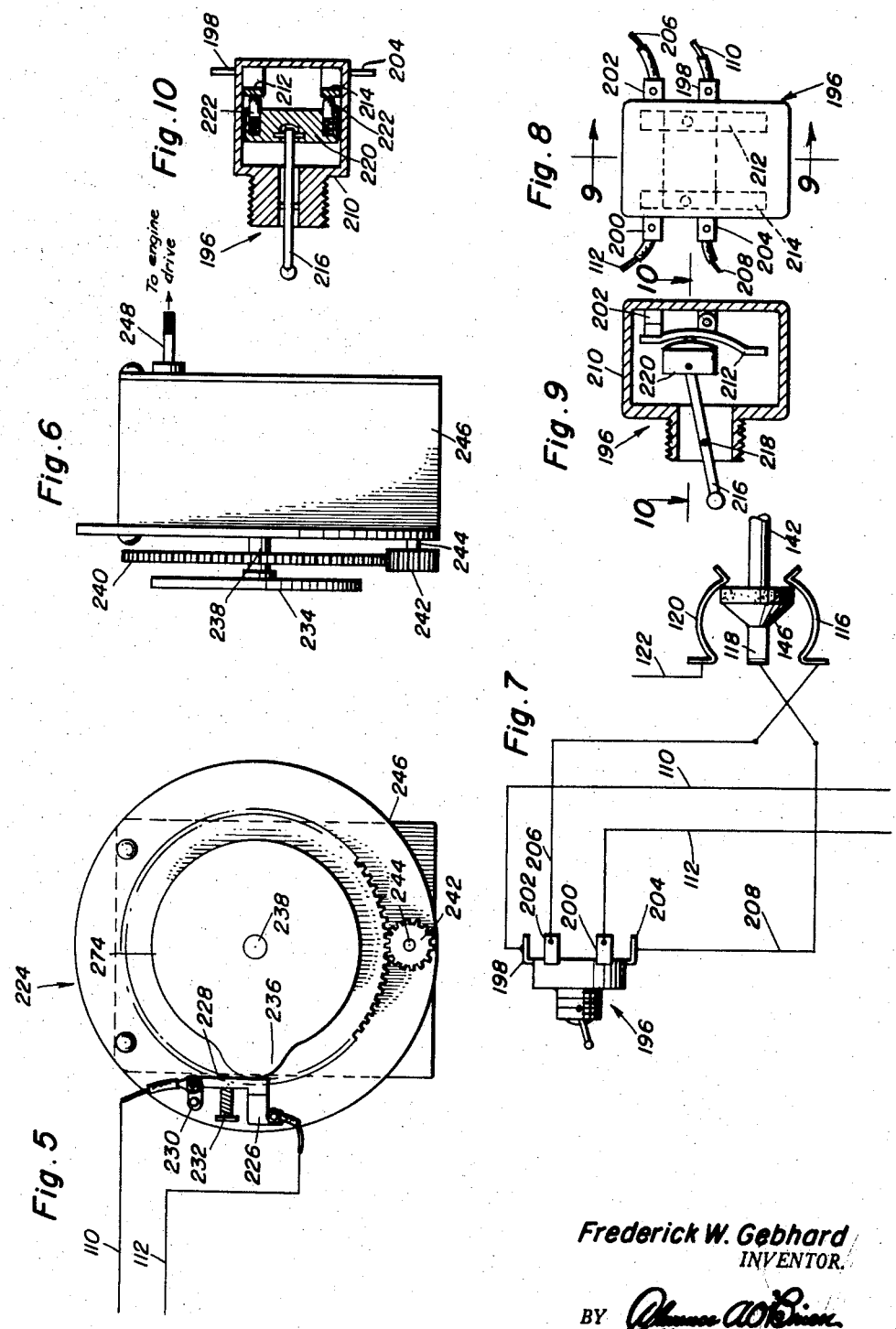
Frederick W. Gebhard
INVENTOR.

United States Patent Office 2,913,587
Patented Nov. 17, 1959

2,913,587
DUAL BATTERY SWITCH SYSTEM
Frederick W. Gebhard, West Easton, Pa.
Application June 10, 1955, Serial No. 514,439
4 Claims. (Cl. 290—37)

This invention relates in general to new and useful improvements in vehicle ignition systems, and more specifically to a dual battery switch system for vehicle ignition systems.

The primary object of this invention is to provide an improved dual battery arrangement for use in conjunction with vehicle ignition systems, the dual battery arrangement being of a nature whereby one battery is continuously retained in the electrical circuit of the ignition system to be charged and to meet power demands thereon, and the other battery is connected to the electrical circuit whereby it is periodically charged simultaneously with the charging of the one battery, there also being provided means for switching the relationship of these two batteries.

Another object of this invention is to provide an improved dual battery arrangement for vehicle ignition systems, the dual battery arrangement being of a nature whereby one battery is connected directly in the electrical circuit of the ignition system to be charged and to meet power demands thereon and the other battery is periodically charged simultaneously with the charging of the one battery, there being provided control means for connecting the second battery into the ignition system, the control means being driven directly from the vehicle engine, thereby timing the charging of the second battery in direct relation to the time the engine of the vehicle is run.

Still another object of this invention is to provide an improved dual battery arrangement for vehicle ignition systems, there being provided means for charging one of the batteries simultaneously with the utilization and charging of the other battery for the purpose of starting the vehicle engine.

A further object of this invention is to provide an improved switch system for use in conjunction with dual batteries in a vehicle ignition system, the dual switch system including means for automatically charging a second battery of the dual battery arrangement in response to the starting of a vehicle engine and retaining such second battery on charge for a predetermined period of time simultaneously with the charging of the first battery.

A still further object of this invention is to provide an improved battery box arrangement whereby a conventional type of battery box may be easily converted into a battery box for supporting two batteries.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an elevational view with parts in section through a mechanical mechanism for controlling the charging of the batteries of the wiring diagram of Figure 1, the mechanical mechanism being slightly different from that illustrated in Figure 1;

Figure 3 is an enlarged fragmentary transverse vertical sectional view taken substantially upon the plane indicated by the section line 3—3 of Figure 2 and shows the arrangement of the contacts of the circuit maker illustrated in Figure 2;

Figure 4 is a perspective view of a battery box for supporting a pair of batteries to be utilized in the electrical circuit of Figure 1, there also being illustrated the manually controlled switch for the purpose of switching from one battery to the other;

Figure 5 is an elevational view of a slightly modified form of circuit maker to be utilized in the wiring diagram of Figure 1 in lieu of the circuit maker illustrated therein;

Figure 6 is a side elevational view of the circuit maker and shows the general details of the gear box for regulating the operation thereof;

Figure 7 is an additive modification to the wiring diagram of Figure 1 and illustrates the details of a control switch;

Figure 8 is a rear elevational view of the control switch of Figure 7 on a larger scale;

Figure 9 is an enlarged fragmentary vertical sectional view taken substantially on the plane indicated by the section line 9—9 of Figure 8 and shows the details of the toggle mechanism of the switch; and Figure 10 is an enlarged fragmentary sectional view taken substantially upon the plane indicated by the section line 10—10 of Figure 9 and shows further the details of the switch.

Figure 1:
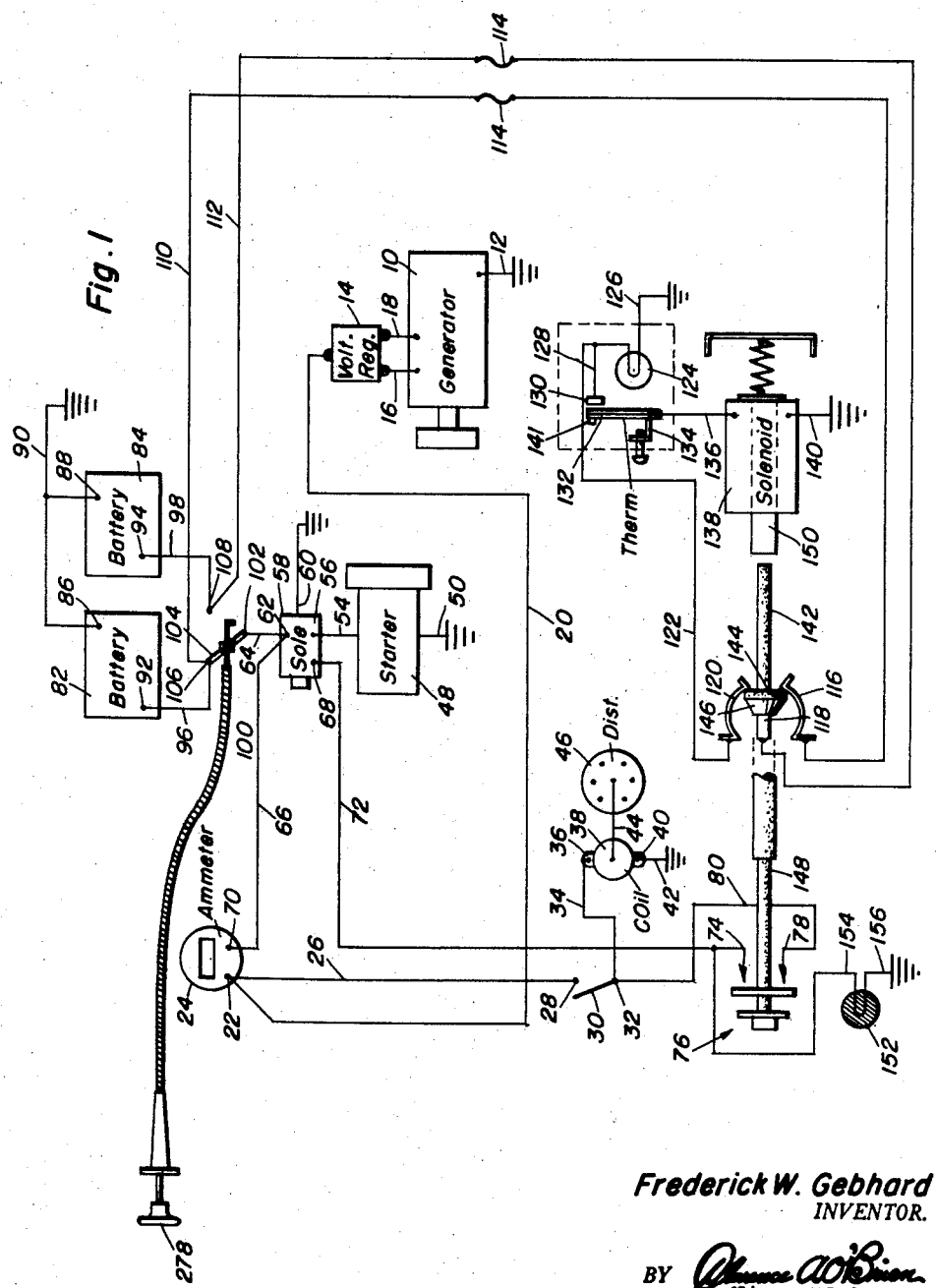
Figure 1 is a wiring diagram incorporating a conventional type of ignition system circuit for vehicles, there being tied into the ignition system circuit the circuit for a pair of batteries in lieu of the normal single battery and a circuit for controlling the systematic charging of such batteries.

Referring now to Figure 1 in particular, it will be seen that there is illustrated the basic wiring diagram for the present invention, a major portion of the wiring diagram being that of the conventional ignition system of an automotive vehicle. The ignition system includes a generator 10 which is grounded by means of the wire 12. The ignition system also includes a voltage regulator 14 which is connected in series with the generator 10 by means of a pair of wires 16 and 18, the voltage regulator operating to connect the generator to a battery circuit for charging when it develops a sufficient voltage, and to regulate the voltage of the generator.

Extending from the voltage regulator 14 is the main supply line 20 of the ignition system, the main supply line 20 being connected to a terminal 22 of an ammeter 24. Also connected to the terminal 22 is a wire 26 whose opposite end is connected to a contact 28 of an ignition switch 30.

The ignition switch 30 includes a second terminal 32 which has connected thereto a wire 34. The wire 34 is connected to a terminal 36 of the ignition coil 38. The coil 38 includes a second terminal 40 which has connected thereto a grounded wire 42. Extending from the coil 38 is a high voltage wire 44 which is connected to a distributor 46.

The vehicle ignition system also includes a starter 48 which is grounded by means of a wire 50. Also connected to the starter 48 is a wire 54 connected to a terminal 56 of a starter control solenoid 58. The solenoid 58 is grounded, as at 60.

The solenoid 58 includes a contact 62 which has connected thereto a battery lead wire 64. Also connected to the terminal 62 is a wire 66 which is connected to a second terminal 70 of the ammeter 24.

In order that the operation of the solenoid 58 may be controlled, the solenoid includes a third contact 68 to which there is connected a wire 72. The wire 72 has the opposite end thereof connected to a terminal 74 of a push-button type control switch 76 for the solenoid 58. The switch 76 includes a second contact 78 which has connected thereto a wire 80, the wire 80 having its opposite end connected to the terminal 32 of the ignition switch 30.

The foregoing ignition circuit is conventional and need not be described further. It is incomplete only in that there has been described no details of the battery normally found in such an ignition circuit.

The present invention relates to the use of a pair of batteries, such as the batteries 82 and 84 in lieu of the usual single battery of a vehicle ignition system. The batteries 82 and 84 include first terminals 86 and 88, respectively, which are connected to a ground wire 90. The batteries 82 and 84 also include second terminals 92 and 94, respectively, which have connected thereto separate lead wires 96 and 98, respectively. Interposed between the lead wires 96, 98 and 64 is a selector switch which is referred to in general by the reference numeral 100. The selector switch 100 is of the single-pole double-throw type, and includes a contact 102 to which the lead wire 64 is connected. Pivotally connected to the contact 102 is a switch blade 104. Selectively engageable by the switch blade 104 are terminals 106 and 108 to which there are connected the lead wires 96 and 98, respectively. It is to be understood that by operating the switch blade 104, the batteries 82 and 84 may be selectively connected in the above described ignition circuit.

In order that one of the batteries may be periodically charged while the other of the batteries is being utilized in the ignition circuit, there is connected to the contact 106 a wire 110. A similar wire 112 is connected to the contact 108. The wires 110 and 112 are provided with fuses 114 intermediate their ends. The opposite ends of the wires 110 and 112 are connected to spring contacts 116 and 118, respectively. The contacts 116 and 118 are arranged in circumferentially spaced relation with respect to a spring contact 120. Connected to the spring 120 is a wire 122.

The opposite end of the wire 122 is connected to a heating unit, preferably in the form of a low candle-power bulb 124. The bulb 124 is grounded by means of a wire 126.

Connected to the wire 122 is a wire 128 whose opposite end is connected to a fixed contact 130. Normally disengaged from the fixed contact 130 is a bimetallic contact 132 which is adjustably mounted, as at 134. The bimetallic contact 132 has connected thereto a wire 136 whose opposite end is connected to a solenoid or other electromagnetic device 138. The solenoid 138 is grounded by a ground wire 140. In order that the contact 132 may have a snap closing action there is mounted in insulated relation a magnet 141 which underlies and normally holds down the contact 132. When the temperature effect on the contact 132 is sufficient, it will pull from the magnet 141 and engage the contact 130.

Extending longitudinally through the center of the space bounded by the spring contacts 116, 118 and 120 is an insulated rod 142. The rod 142 has mounted thereon intermediate its ends an insulated collar 144. Mounted on the insulator rod 142 in insulated abutting relation with respect to the collar 144 is a bridging member 146. The bridging member 146 is selectively engageable with the spring contacts or contact fingers 116, 118 and 120 so as to electrically connect together the same.

In order that the bridging member 146 may be moved into an operative position, the insulated rod 142 is provided with an extension 148 which is, in turn, connected to the push-button switch 76. When the push-button switch 76 is actuated, the bridging member 146 is moved to the right, as viewed in Figure 1, to bridge across the contact fingers 116, 118 and 120. When the bridging member 146 is moved to the right, it shoulders against the ends of the contact fingers 116, 118 and 120 and natural movement thereof to the left is prevented.

When the bridging member 146 is in an operative position, the heating element 124 is energized and begins to heat the bimetallic contact 132. The bimetallic contact 132 then bends towards the contact 130 and after a predetermined period of time, is sufficiently heated in order to bend to the front where it engages the contact 130. This then completes the circuit to the electromagnetic device 138 which has a plunger 150. The plunger 150 is urged to the left engaging the insulated rod 142 and moving the same to the left to move the bridging member 146 out of contact with the spring fingers 116, 118 and 120.

Because of the particular connection of the wires 110 and 112, when the two are connected together by the bridging member 146, the particular battery which is not connected in the ignition circuit will be connected to the generator 10 simultaneously with the other battery for the purpose of charging the particular battery. The time of charging will be determined by the amount of time required to sufficiently heat the bimetallic contact 132 to move it into engagement with the contact 130.

In order to remind the operator of the vehicle of which the present invention is a part to switch from one battery to the other manually, there is provided a signal light 152. The signal light 152 has one contact thereof connected to the wire 72 by a lead 154. A second wire 154 is utilized to ground the signal light 152. Thus, when the push-button switch 76 is actuated to energize the starter 48, the signal light 152 will be momentarily lit to remind the operator that it may be time to change the batteries in the ignition circuit. It is to be understood that the signal light 152 may be replaced by another type of signal light, or omitted, as desired.

Referring now to Figures 2 and 3, it will be seen that there is illustrated the mechanical details of the switch for closing the circuit between the wires 110 and 112. It is to be seen that there is provided an angle bracket, which is referred to in general by the reference numeral 158. The angle bracket 158 includes a vertical flange 160 which may be conveniently secured to the forward wall of a fire wall. The angle bracket 158 also includes a forwardly extending horizontal flange 162. Mounted on the horizontal flange 162 and extending upwardly therefrom is a pair of insulated mounting blocks 164 and 166. The block 164 is provided with a bore 168 slidably receiving the insulated rod 142. The block 166 is provided with a fitting 170 which receives both the insulated rod 142 and the plunger 150 of the solenoid 138. Further, there is secured to the block 166 a housing 172 in which the bridging member 146 and associated parts of the circuit maker, including the contact fingers 116, 118 and 120 are mounted.

Secured to the vertical flange 160 above the elements of the circuit maker is a mounting bracket 174. The mounting bracket 174 carries a housing 180 in which the details of the timer, including the heating element or bulb 124 and the contacts 130 and 132 are mounted. In this manner, the heat from the bulb 124 may be confined into a relatively small space so that better control may be provided.

While the mechanism of Figure 2 includes substantially all of the elements of the circuit maker of Figure 1, there is provided a slightly modified form of control mechanism. This includes a solenoid or other electromagnetic device 182 which is mounted on the horizontal flange 162. The soldenoid 182 includes a plunger 184 which is aligned with and is normally engaged with the insulated rod 142. The solenoid 182 is connected to the terminal 74 of the push-button switch 76 by means of a wire 186. Thus, whenever the push-button switch 76 is actuated to energize the solenoid 58, the solenoid 182 is also energized to move the plunger 184 thereof and the insulated rod 142 to the right, as viewed in Figure 2, to actuate the circuit maker. It will thus be seen that an electromechanical connection is provided in lieu of the straight mechanical connection of Figure 1.

Illustrated in Figure 2 is a signal light which is referred to in general by the reference numeral 188. The signal light 188 includes a bulb 190 mounted in a socket 192. The socket is grounded, and it is preferably mounted on the instrument panel of the vehicle. Connected to the socket 182 is a wire 194 whose opposite end is connected to the contact finger 120. Thus, when the battery not connected in the ignition circuit is being charged, the bulb 190 will light up and act as a signal to the operator of the vehicle of the charging of the second battery.

Referring now to Figure 7 in particular, it will be seen that there is illustrated a control switch which is referred to in general by the reference numeral 196. The control switch 196 is interposed between the ends of the wires 110 and 112 and their respective contact fingers 116 and 118. The wires 110 and 112 are connected to terminals 198 and 200 of the switch 196. The switch 196 also includes terminals 202 and 204 to which there are connected wires 206 and 208, respectively. The wires 206 and 208 are connected to the contact fingers 116 and 118, respectively.

The switch 196 includes a housing 210. The housing 210 has mounted therein a pair of fixed contacts which function as extensions of the terminals 200 and 202. Pivotally mounted within the housing 210 is a pair of contact bars 212 and 214 to which the terminals 198 and 204, respectively, are connected. The contact bars 212 and 214 are selectively engageable with the contacts which form the extensions of the terminals 202 and 200, respectively. In order that the contact bars 212 and 214 may be selectively moved into engagement with their respective contacts, there is provided a toggle arm 216 pivotally mounted in the housing 210, as at 218. The toggle arm 216 carries a follower 220 which is retained in engagement with the contact bars 212 and 214, the contact bars 212 and 214 being provided with intermediate arcuate portions engageable with pins 222 resiliently carried by the follower 220.

From the foregoing description of the switch 196, it will be readily apparent that the charging of the battery which is not in the ignition circuit may be discontinued if it is so desired.

Referring now to Figures 5 and 6 in particular, it will be seen that there is illustrated a modified form of circuit maker which is referred to in general by the reference numeral 224. The circuit maker 224 includes a fixed contact 226 to which there is connected the wire 112. There is also provided a pivotally mounted contact 228 which is connected to a terminal 230. Connected to the terminal 230 is the wire 110. The pivotally mounted contact 228 is spring urged away from the contact 226 by means of a spring 232.

Mounted closely adjacent the pivotally mounted contact 228 is a cam wheel 234 having a cam portion 236. The cam portion 236 is periodically engaged with the pivotally mounted contact 228 to move it into engagement with the fixed contact 226 and close the circuit between the wires 110 and 112.

The cam wheel 234 is carried by a shaft 238 which has mounted thereon a driven gear 240. Engaged with the driven gear 240 is a relatively small drive gear 242 carried by a shaft 244. The shafts 238 and 244 are rotatably journaled relative to a supporting housing 246. Mounted within the supporting housing 246 and drivingly connected to the shaft 244 is reduction gearing (not shown). The reduction gearing includes a drive shaft 248. The drive shaft 248, while it is not illustrated, will have coupled thereto a drive shaft which in turn will be properly connected to an automotive engine so that the operation of the automotive engine will control the driving of the cam wheel 234. It is to be understood that the reduction of drive is such that the cam wheel 234 will move very slowly and that the cam member 236 will be so contoured so as to give the desired charging time for each revolution of the cam wheel 234.

Inasmuch as it is the intention of this invention to provide two batteries in lieu of the customary single battery, it is necessary that there be provided an adaptation of the battery box of the vehicle for supporting two batteries. Illustrated in Figure 4 is a conventional battery box which hereinafter will be considered as a first battery box section, the battery box section being referred to in general by the reference numeral 250. The battery box section 250 includes a wall 252 which is mountable on a vehicle fender or other parts of a vehicle body in a desired position. Extending normal to the wall 252 is a pair of end walls 254 and 256. A side of the first box section 250 remote from the wall 252 is left open and in the case of the original battery box, will have been cut away.

The battery box also includes a second box section which is referred to in general by the reference numeral 258. The box section 258 includes a bottom wall 260, end walls 262 and 264, and side walls 266 and 268. The second box section 258 is of a size to seat within the first box section 250 with the walls 262, 264 and 266 thereof in abutting engagement with the inner surfaces of the walls 254, 256 and 252 of the box section 250, respectively. When a first battery, such as the battery 82, is mounted in the battery box, it seats on that portion of the bottom wall 260 overlying the bottom wall (not shown) of the first box section 250. That in itself serves to hold the second box section 258 with respect to the first box section 250. If desired, the second box section 258 may be suitably welded or otherwise secured to the first box section 250. The box section 258 is of a size to also receive the second battery 84. Carried by the end walls 254 and 256 and end walls 262 and 264 are suitable hold-downs 270 and 271, respectively, for engaging the batteries and retaining them in the battery box.

Mounted on the exterior surface of the side wall 268 is an insulated block 272. The block 272 has mounted thereon the components of the switch 100. In order that the switch blade 104 may be manually manipulated, there is anchored on the side wall 268 one end of a flexible cable housing 274. Engaged within the flexible cable housing 274 is a flexible cable 276 which has one end thereof connected in insulated relation to the switch blade 104. The opposite end of the cable 276 is provided with a pull handle 278. The pull handle 278 is preferably mounted within the interior of a vehicle so that the batteries 82 and 84 may be selectively connected in the ignition circuit as desired by the driver of the car without any effort whatsoever on his part except the pulling or pushing of the control knob 278, as is necessary.

From the foregoing description of the present invention, it will be readily apparent that there has been provided a two-battery system for use in conjunction with ignition systems of vehicles. The arrangement of the two battery system is such that there is always provided one battery which is in the circuit of the ignition system and that there is provided a second battery which is the reserve battery, the reserve battery being so connected whereby it is periodically charged so as to retain a maximum charge. Thus, when the operator of a vehicle, for some reason or another, for example, leaving on his radio or his lights, accidentally runs down his battery, he still has on hand a second battery for immediate starting. This second battery will be retained at full charge at all times, and therefore, will ensure the proper starting of the vehicle. Once the vehicle has been started, the uncharged battery may then be switched back into the system for full charge.

Incidentally, the battery not being utilized is more subject to discharge during cold weather. Thus, the use of a heat actuated timer will take into consideration this factor inasmuch as it will require a longer time for the bimetallic contact 132 to be sufficiently heated in the winter time, thus giving a longer charging rate.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dual battery arrangement for use in a conventional vehicle engine electrical system for the type including a starter solenoid control switch, a battery lead wire and a battery ground wire, said dual battery arrangement comprising a pair of batteries, said batteries having first and second terminals, wiring connecting said first terminals to said ground wire, separate wires connected to said second terminals, a switch connected to said separate wires and said lead wire for selectively electrically connecting an individual one of said batteries to said lead wire, other wires connected to respective ones of said separate wires, means connected to said other wires for electrically connecting said other wires to each other whereby said batteries may be simultaneously charged, said means including a circuit maker, operating means connected to said circuit maker, connecting means for connecting said operating means to the starter solenoid control switch for operation thereby, and a holding member for temporarily retaining said operating means in an operating position.

2. A dual battery arrangement for use in a conventional vehicle engine electrical system of the type including a starter solenoid control switch, a battery lead wire and a battery ground wire, said dual battery arrangement comprising a pair of batteries, said batteries having first and second terminals, wiring connecting said first terminals to said ground wire, separate wires connected to said second terminals, a switch connected to said separate wires and said lead wire for selectively electrically connecting an individual one of said batteries to said lead wire, other wires connected to respective ones of said separate wires, means connected to said other wires for electrically connecting said other wires to each other whereby said batteries may be simultaneously charged, said means including a circuit maker, operating means connected to said circuit maker, connecting means for connecting said operating means to the starter solenoid control switch for operation thereby, and a holding member for temporarily retaining said operating means in an operating position, said holding member being in the form of an electromagnetic device, a timer connected in series with said electromagnetic device.

3. A dual battery arrangement for use in a conventional vehicle engine electrical system of the type including a plunger type starter solenoid control switch, a battery lead wire and a battery ground wire, said dual battery arrangement comprising a pair of batteries, said batteries having first and second terminals, wiring connecting said first terminals to said ground wire, separate wires connected to said second terminals, a switch connected to said separate wires and said lead wire for selectively electrically connecting an individual one of said batteries to said lead wire, other wires connected to respective ones of said separate wires, means connected to said other wires for electrically connecting said other wires to each other whereby said batteries may be simultaneously charged, said means including a circuit maker, operating means connected to said circuit maker, connecting means for connecting said operating means to the plunger type starter solenoid control switch for operation thereby, said connecting means being in the form of an operating rod directly engageable with the plunger of the plunger type starter solenoid control switch.

4. A dual battery arrangement for use in a conventional vehicle engine electrical system of the type including a starter solenoid control switch, a battery lead wire and a battery ground wire, said dual battery arrangement comprising a pair of batteries, said batteries having first and second terminals, wiring connecting said first terminals to said ground wire, separate wires connected to said second terminals, a switch connected to said separate wires and said lead wire for selectively electrically connecting an individual one of said batteries to said lead wire, other wires connected to respective ones of said separate wires, means connected to said other wires for electrically connecting said other wires to each other whereby said batteries may be simultaneously charged, said means including a circuit maker, operating means connected to said circuit maker, connecting means for connecting said operating means to the starter solenoid control switch for operation thereby, and a holding member for temporarily retaining said operating means in an operating position, said holding member being in the form of an electromagnetic device, a timer connected in series with said electromagnetic device, said timer including a heat source, and a heat responsive circuit breaker.

References Cited in the file of this patent

UNITED STATES PATENTS

| | | |
|---|---|---|
| 1,288,938 | Leonard | Dec. 24, 1918 |
| 1,898,370 | Hughes et al. | Feb. 21, 1933 |
| 2,564,957 | Cermak | Aug. 21, 1951 |
| 2,629,059 | Baumheckel | Feb. 17, 1953 |
| 2,692,953 | Markett | Oct. 26, 1954 |
| 2,705,254 | Middleton | Mar. 29, 1955 |
| 2,718,540 | Betz | Sept. 20, 1955 |
| 2,729,750 | Draper et al. | Jan. 3, 1956 |
| 2,730,630 | Bruno | Jan. 10, 1956 |